Aug. 4, 1964　　　G. T. R. CAMPBELL ETAL　　　3,143,225
CONVEYOR APPARATUS FOR THE UNLOADING OF BULK CARGOES FROM SHIPS
Filed May 16, 1961　　　　　　　　　　　　　　　　12 Sheets-Sheet 1
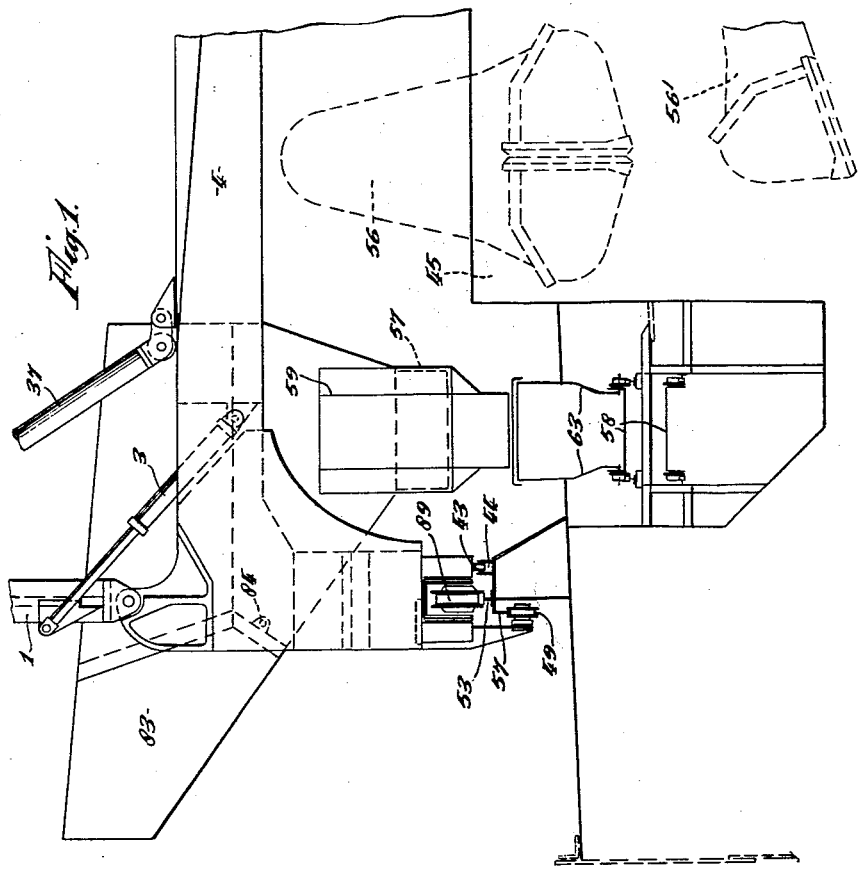
INVENTORS
GEORGE THOMAS RICHARDSON
　　　　CAMPBELL
NORMAN VERNON LASKEY
THOMAS BENTHAM HEMSLEY
By Kenyon & Kenyon
　　　　　ATTORNEYS.

Aug. 4, 1964　　G. T. R. CAMPBELL ETAL　　3,143,225
CONVEYOR APPARATUS FOR THE UNLOADING OF BULK CARGOES FROM SHIPS
Filed May 16, 1961　　　　　　　　　　　　　　　　12 Sheets-Sheet 2
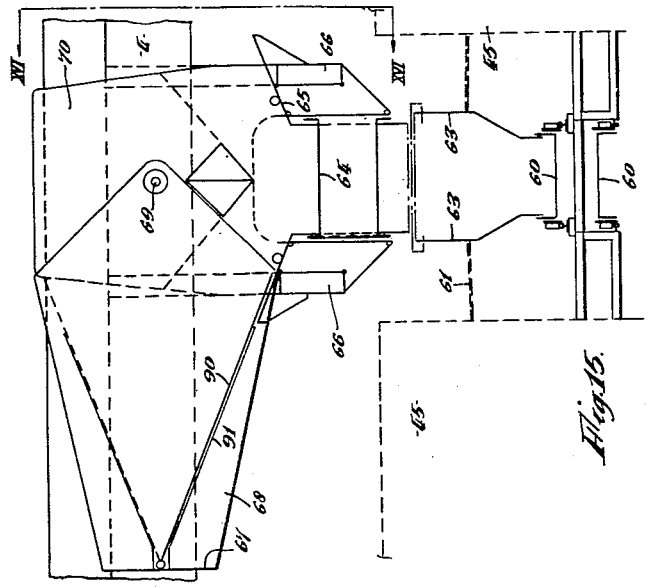
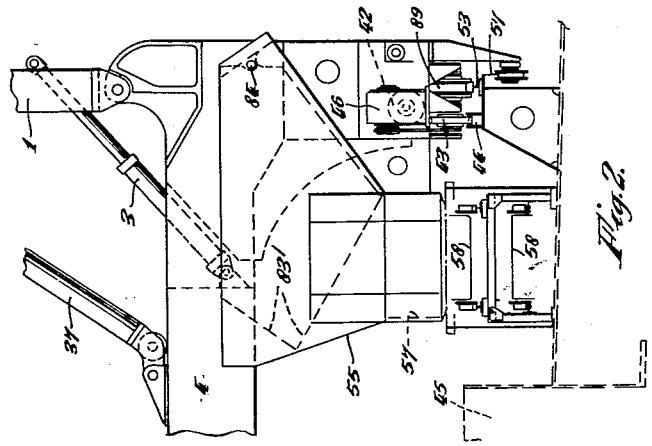
INVENTORS
GEORGE THOMAS RICHARDSON
　　　　　CAMPBELL
NORMAN VERNON LASKEY
THOMAS BENTHAM HEMSLEY
BY Kenyon + Kenyon
　　　　　　　ATTORNEYS

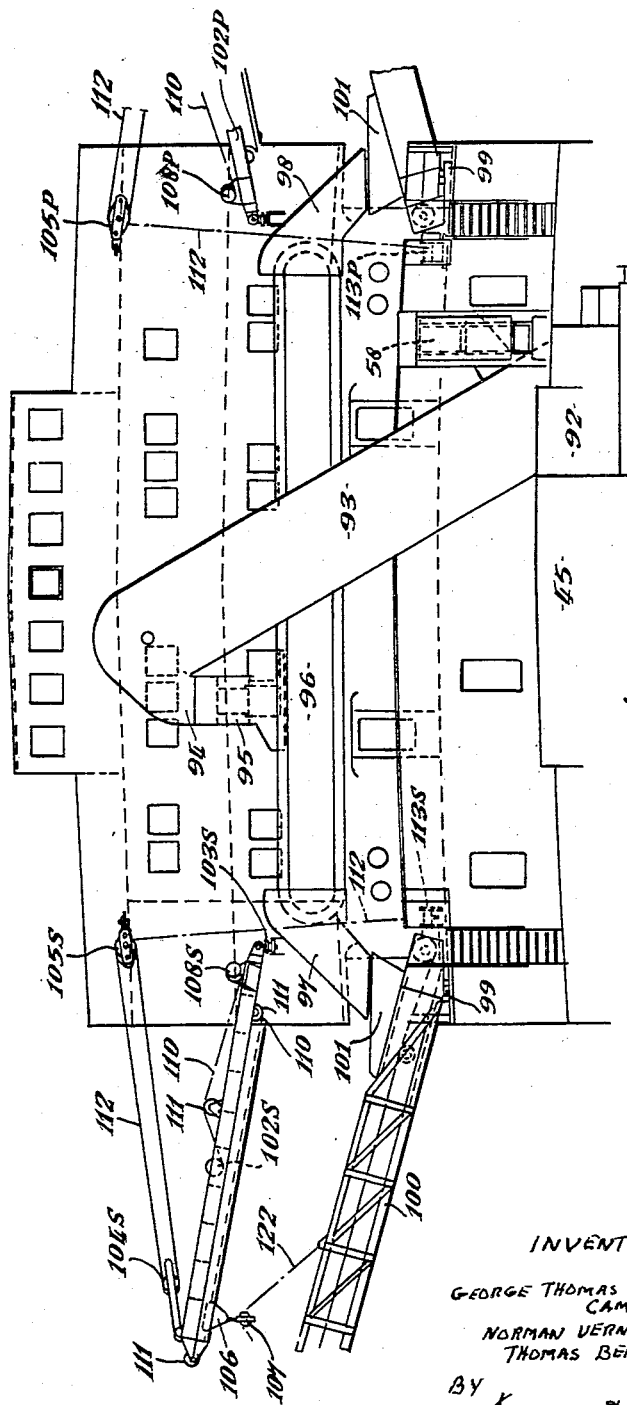

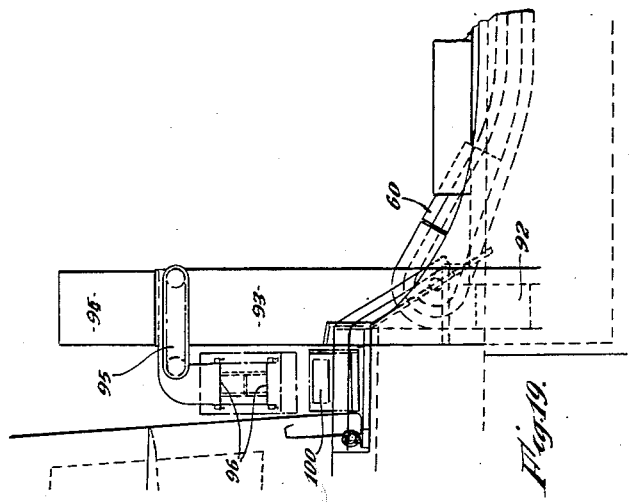
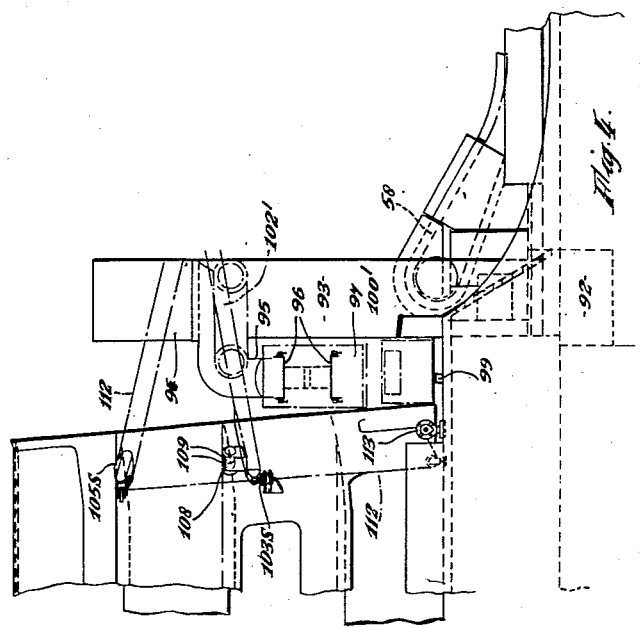

Aug. 4, 1964  G. T. R. CAMPBELL ETAL  3,143,225
CONVEYOR APPARATUS FOR THE UNLOADING OF BULK CARGOES FROM SHIPS
Filed May 16, 1961  12 Sheets-Sheet 5
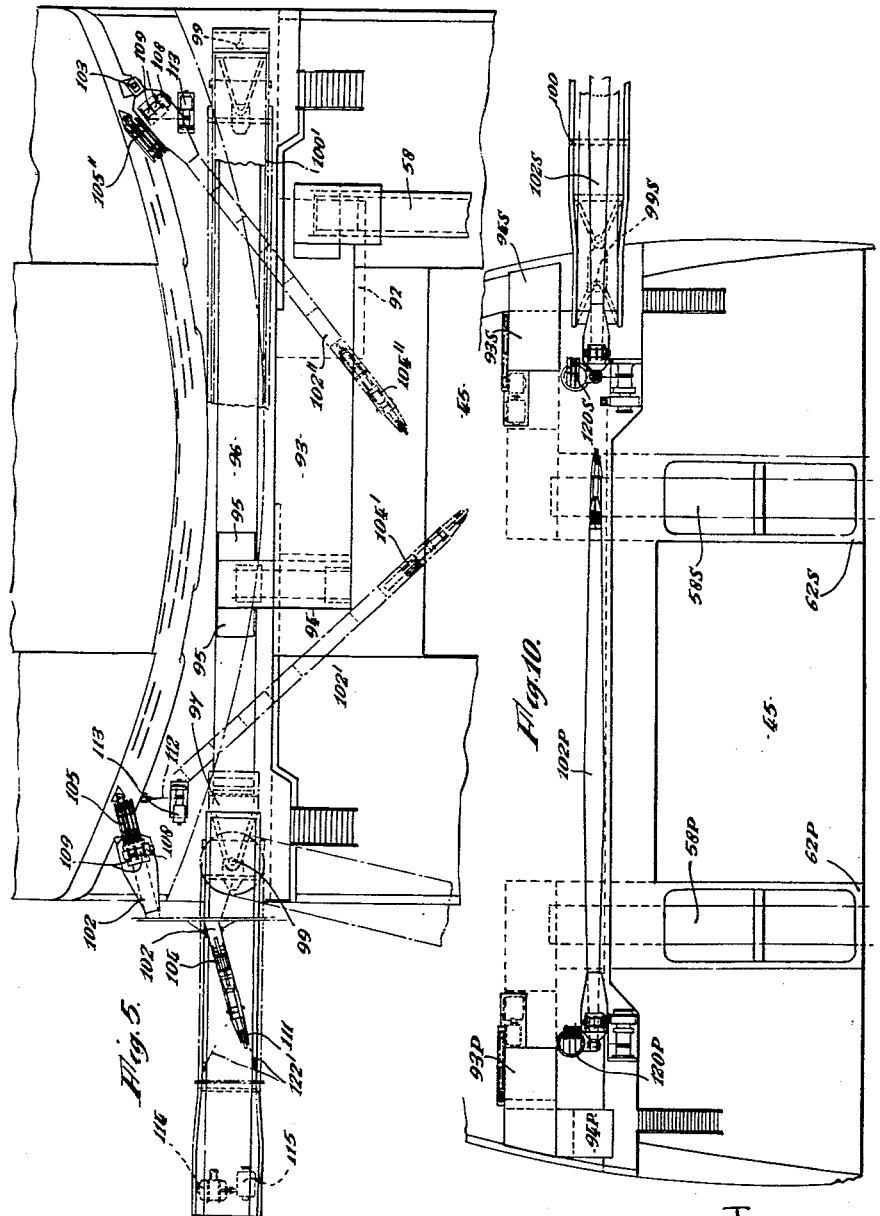
INVENTORS
GEORGE THOMAS RICHARDSON
CAMPBELL
NORMAN VERNON LASKEY
THOMAS BENTHAM HEMSLEY
By Kenyon & Kenyon
ATTORNEYS

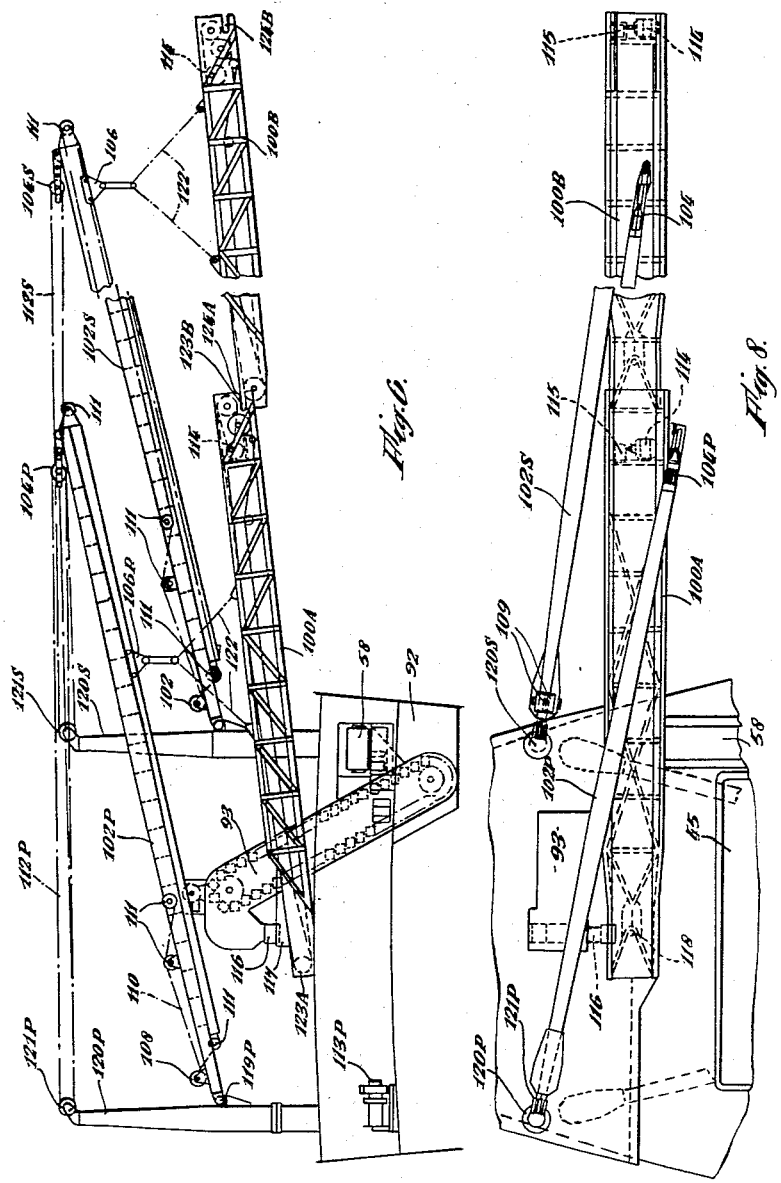

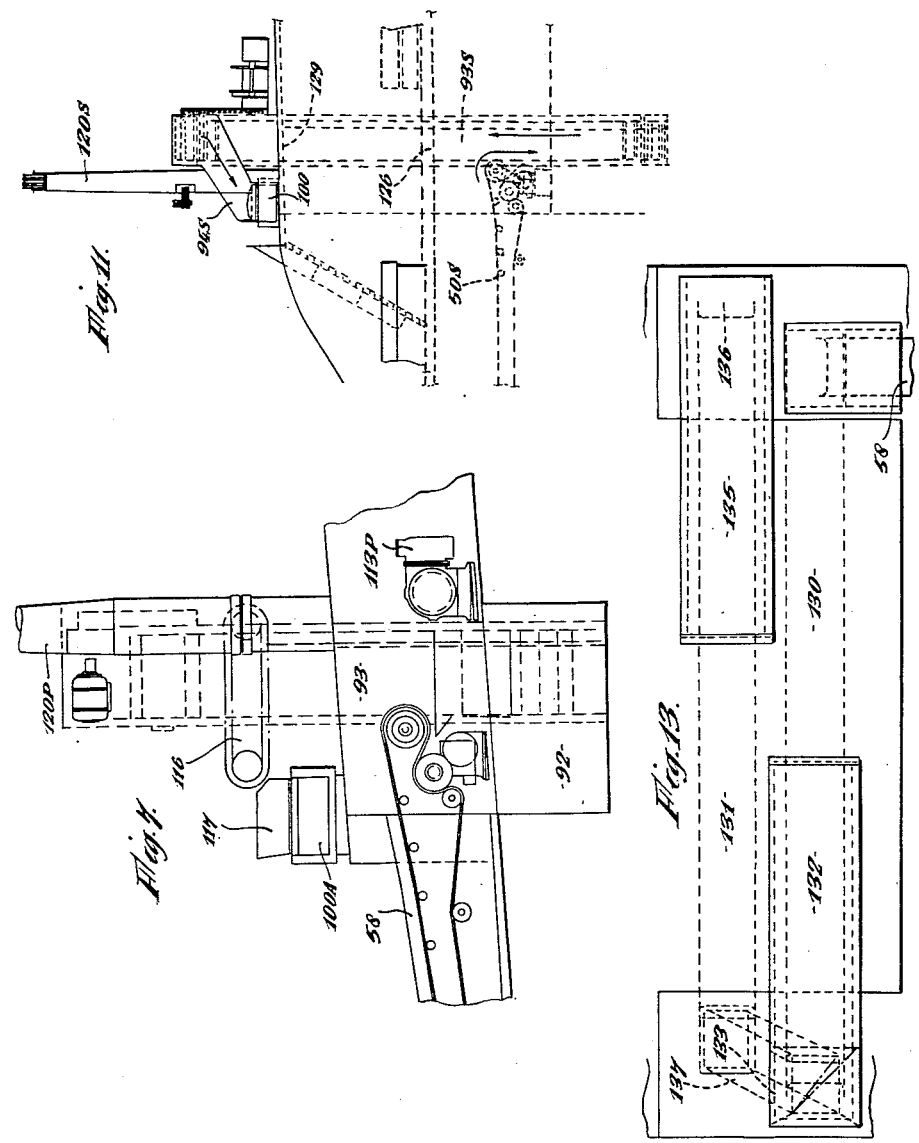

Aug. 4, 1964   G. T. R. CAMPBELL ETAL   3,143,225
CONVEYOR APPARATUS FOR THE UNLOADING OF BULK CARGOES FROM SHIPS
Filed May 16, 1961   12 Sheets-Sheet 8
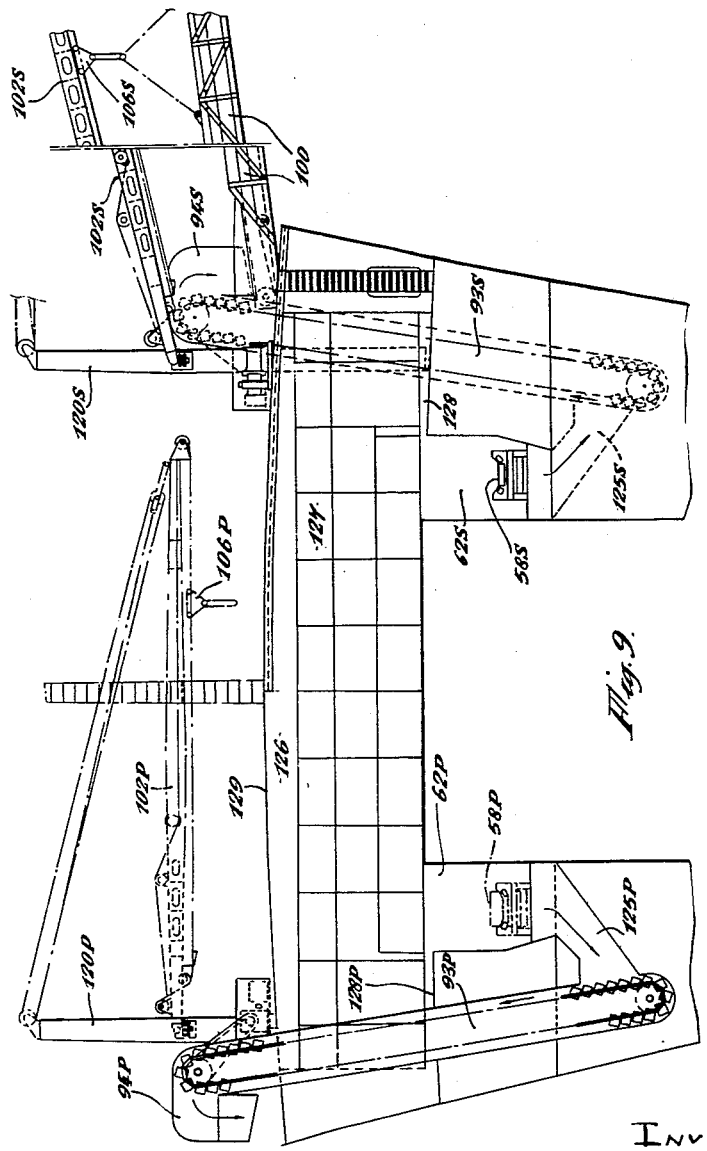

Aug. 4, 1964   G. T. R. CAMPBELL ETAL   3,143,225
CONVEYOR APPARATUS FOR THE UNLOADING OF BULK CARGOES FROM SHIPS
Filed May 16, 1961   12 Sheets-Sheet 9
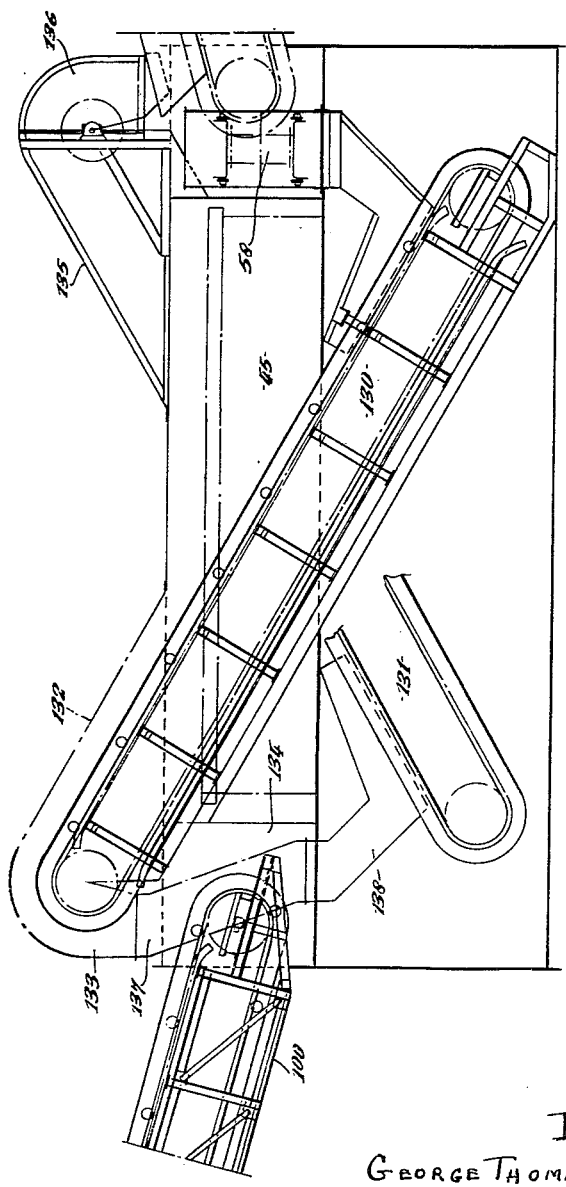
INVENTORS
GEORGE THOMAS RICHARDSON CAMPBELL
NORMAN VERNON LASKEY
THOMAS BENTHAM HEMSLEY
BY Kenyon & Kenyon
ATTORNEYS

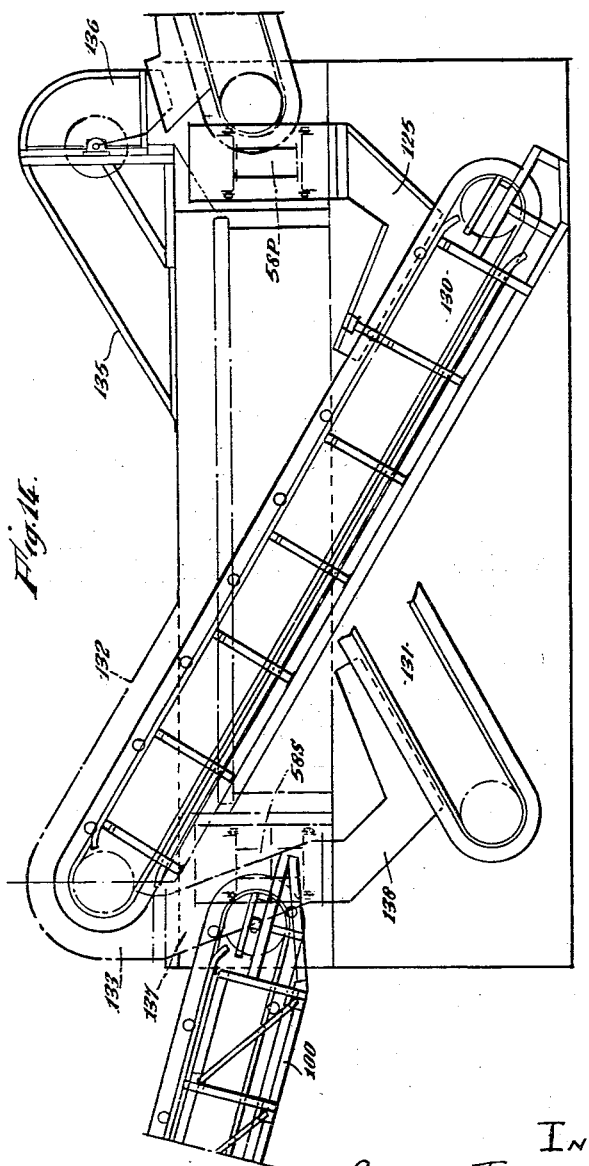

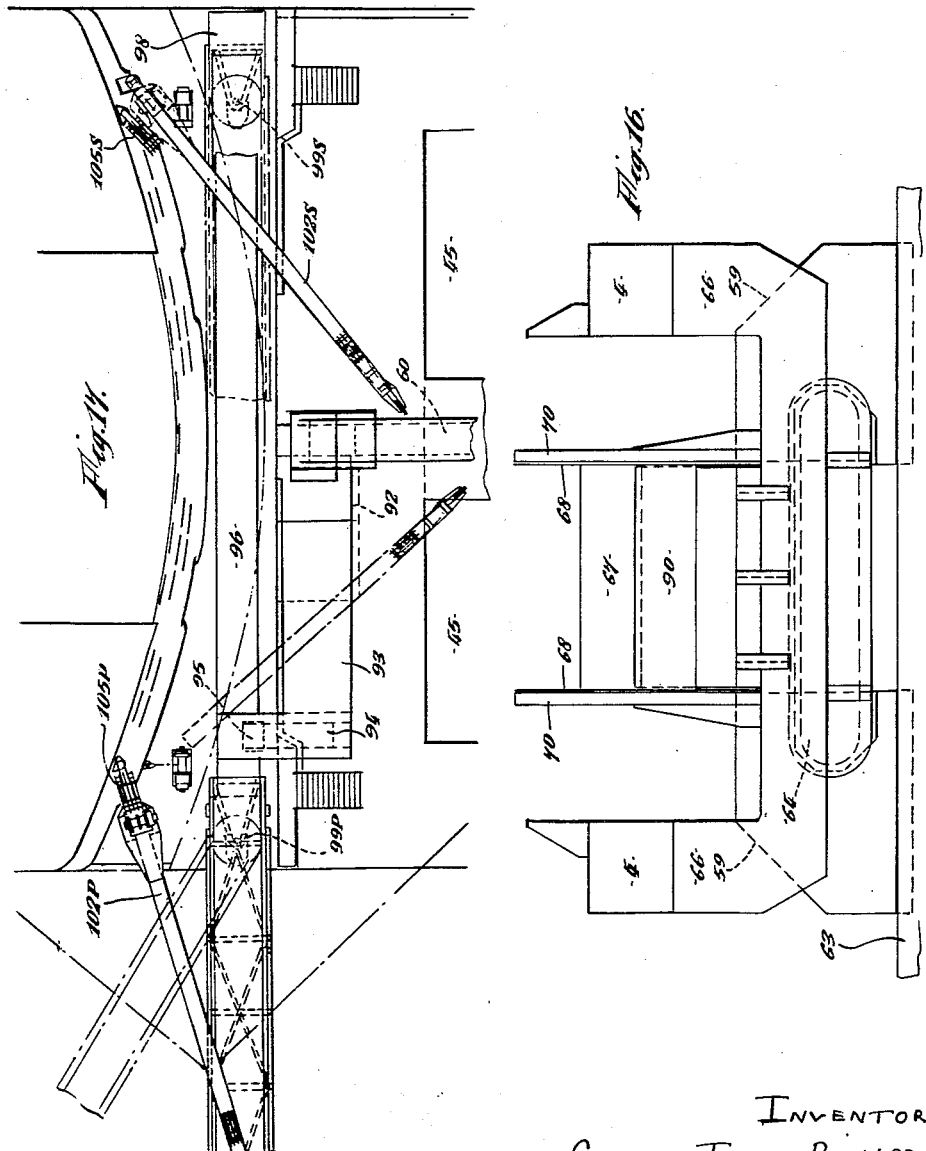

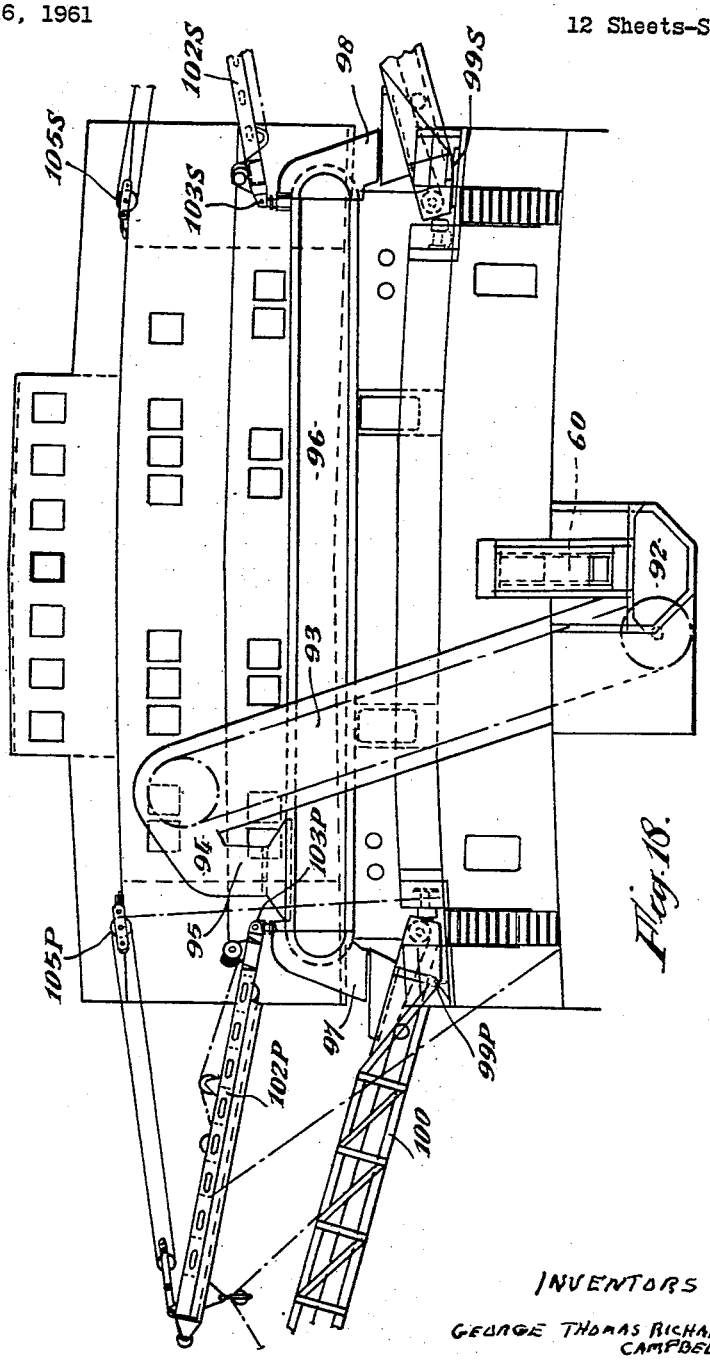

United States Patent Office 3,143,225
Patented Aug. 4, 1964

3,143,225
CONVEYOR APPARATUS FOR THE UNLOADING OF BULK CARGOES FROM SHIPS
George Thomas Richardson Campbell, Montreal, Quebec, and Norman Vernon Laskey, St. Lambert, Quebec, Canada, and Thomas Bentham Hemsley, South Gosforth, Newcastle-upon-Tyne, England, assignors to International MacGregor Organization (I.M.G.O.), Monte Carlo, Monaco, a body corporate of Monaco
Filed May 16, 1961, Ser. No. 110,366
Claims priority, application Great Britain May 21, 1960
12 Claims. (Cl. 214—15)

This invention relates to apparatus for the unloading from ships of bulk cargoes, that is, cargoes of granular or lumpy material such as grain, sugar, salt, ores, stone, coal and coke.

An object of the invention is to provide means whereby such bulk cargoes can be discharged from a large or relatively large ship (e.g., a ship having a displacement of about 30,000 tons, with a length of 600 feet and provided with 6 to 8 cargo holds) at a selected location adjacent the forward or after end of the ship, to a quay alongside which the ship is moored, or to lighters moored alongside the ship.

Another object is to provide means whereby such bulk cargoes are dischargeable at a location distant from the ship's side by at least the breadth of beam of the ship (e.g., in a ship of the size above referred to, at least 75 feet) in a continuous operation.

It is known to provide a ship with hopper-bottom holds for granular cargoes, with a belt conveyor located below the holds and an elevator for lifting material transferred by such conveyor to a discharge point. Such an arrangement evidently causes a substantial loss of cubic capacity of the holds. Provided that a ship is equipped with means for operating grabs for lifting the bulk cargo from the holds, or trades between ports where the unloading installations include means for operating such grabs, the invention eliminates this disadvantage, and enables maximum utilisation of the interior of the ship for cargo hold space.

The invention provides, in a ship, unloading apparatus for bulk cargo comprising at least one belt or trough conveyor extending lengthwise of the ship's hatch deck, at least one overside discharge belt conveyor and means for supporting said discharge conveyor in extension from or over either side of the ship at one end of said hatch deck, and elevator-conveyor means for transferring cargo from said lengthwise conveyor to said discharge conveyor.

Said lengthwise conveyor may be mounted upon the hatch deck, or may be mounted in a longitudinal trunk below said deck.

In a ship wherein each hold has a single hatch said lengthwise conveyor may be located on either side of the hatches, or two such conveyors may be located one at each side of the hatches.

Alternatively, in a vessel designed as an "open ship," that is, with two hatches for each hold, a single lengthwise conveyor may be located between the pairs of hatches, either upon the hatch deck or in a trunk below said deck.

In apparatus as aforesaid, an overside discharge conveyor may be adapted to be pivotally anchored by its inner end upon either of two anchorages adjacent opposite sides of the ship, and to be slung upon either of two booms each universally pivoted at its inner end and supported by a multiple purchase cable from a winch.

Alternatively, said overside discharge conveyor may be adapted to be pivotally anchored by its end upon an anchorage located at the centre line of the ship, and to be slung for extension over either side of the ship upon either of said two booms.

In another embodiment, unloading apparatus according to the invention may comprise two like overside discharge conveyors, either one of them being adapted to be pivotally anchored as stated, and said two conveyors having means for their interconnection in tandem with the discharge end of said one conveyor located to feed material to the receiving end of the other, each of said conveyors being slung upon one of said two booms.

Advantageously, the or each boom has an underslung trolley displaceable along the boom, and the or each discharge conveyor is slung from said trolley. Each of said booms and its multiple purchase may be universally anchored upon a lateral portion of a wall of a superstructure of the ship, or upon one of two sampson posts standing upon a deck of the ship.

In unloading apparatus as aforesaid, various embodiments of elevator-conveyor means may be provided for the transfer of material delivered from the or each lengthwise conveyor to said overside discharge conveyor, when located to extend from an anchorage at either side of the ship, or when located to extend over either side of the ship from an anchorage at the centre line of the ship.

Various embodiments of unloading apparatus according to the invention will be described hereinafter by way of example with reference to the accompanying drawings, wherein:

FIG. 1 is a fragmentary transverse view of a ship's deck and hatch with a lengthwise conveyor according to the invention, housed in a trunk beside the hatches, and part of an unloading bridge as described in our co-pending patent application Serial No. 110,365, filed May 16, 1961.

FIG. 2 is a similar view showing a modified location on deck of the lengthwise conveyor;

FIG. 3 is an elevation of a ship's poop front, looking aft, showing overside discharge conveyor means, and FIGS. 4 and 5 are respectively a side elevation and a plan view of the same;

FIGS. 6, 7 and 8 are respectively a transverse elevation, a side elevation and a plan view of another embodiment of overside discharge conveyor means;

FIGS. 9, 10 and 11 are respectively a transverse elevation, a plan view and a side elevation of another embodiment of lengthwise conveyors, elevators and overside discharge conveyor means;

FIG. 12 is a transverse elevation of another embodiment of elevator means and overside discharge conveyor means, and FIG. 13 is a diagrammatic plan view of said elevator means;

FIG. 14 is a transverse elevation of a modified arrangement of the same;

FIG. 15 is a fragmentary transverse section of an "open ship" with a lengthwise conveyor according to the invention, disposed between pairs of hatches, and a feeder hopper for said conveyor carried by an unloading bridge as described in our said co-pending application Ser. No. 110,365, and FIG. 16 is a section on the line XVI—XVI of FIG. 15, and FIGS. 17, 18 and 19 are respectively a plan view, a view of a poop front looking aft, and a side elevation, showing an embodiment of elevator and overside discharge conveyor means suitable for use with a lengthwise conveyor as shown in FIG. 15.

In FIG. 1 an endless conveyor of the belt or trough type 53 is shown in transverse section, running lengthwise of a ship in a longitudinal trunk beside hatches 45 of a series of holds. The ship is equipped with a loading and unloading bridge of the kind described in and forming the subject-matter of our co-pending patent application Ser. No. 110,365. This bridge is mounted on four vertical columns 1 braced by struts 37, which are supported upon a rectangular transverse frame 4. The frame 4 runs upon longitudinal rails 53 supported upon the ship's deck, is displaceable upon said rails by pinions 43 engaging horizontal racks 44, and is held down by trod rollers 49 which engage beneath a track 51 parallel with the rails 53. The bridge, which is not shown, carries means such as a transverse displaceable crab with hoisting and closing rope drums for a grab 56, whereby such grab can be lowered into the hold 45, opened and closed for picking up a portion of a bulk cargo, lifted from the hold and displaced laterally to be opened over a hopper 55 carried by the displaceable frame 4. The hopper 55 is provided with a longitudinally extending endless apron conveyor 57 within a double-ended hood 59, the lower discharge openings of which can register with a pair of guide plates 63 disposed over the upper run of the conveyor 58 and extending for approximately the length of the hold. It will be seen that the hopper 55, including an outwardly extensible upper section 83, has such width that the grab 56 can be fully opened above it, and so that all the material released by opening of the grab is discharged on to the conveyor 58.

FIG. 2 is a corresponding view of the other side of the main carriage 4 of the loading and unloading bridge, and shows a modification wherein the conveyor 58 according to the present invention is mounted upon the ship's deck, instead of being housed in the longitudinal trunk as shown in FIG. 1. FIG. 2 shows the hopper 55 with its upper section turned inwards about a pivot 84 to the position 83', at which it is housed within the lower fixed portion of the hopper 55, and also shows a drive motor 42 and speed reduction gear 46 housed in fore-and-aft members of the rectangular carriage 4 whereby the pinions 43 in engagement with the racks 44 are driven for displacing the carriage 4 lengthwise of the ship's deck.

It will be evident that in a ship not provided with a mobile bridge according to our aforesaid co-pending patent application, the conveyor 58 in either of the arrangements shown in FIGS. 1 and 2 can be fed with granular or lumpy material raised from the holds 45 by the provision of a hopper locatable in a suitable position to supply the conveyor, and with the use of any equipment on board ship which is capable of operating grabs for lifting bulk cargo from the holds or with the use of unloading installations ashore which include means for operating such grabs.

FIGS. 3, 4 and 5 illustrate one embodiment of means for receiving bulk materials from the lengthwise conveyor 58 when disposed on deck at one side of the hatches 45, elevating said material and discharging it overside. The single belt conveyor 58 extends to the break of the ship's poop, at which its discharge end is raised to feed the material into a boot 92 of a bucket elevator 93 which extends across the centre line of the ship and obliquely upwards the level of a navigating bridge. The discharge hood 94 of the bucket elevator opens into a cross feeder 95 whereby the material is delivered to a transverse, reversible endless belt conveyor 96. The latter conveyor, according to the direction in which it is driven, transports the material to one or other of two discharge hoods 97, 98. Beneath each of these hoods the poop deck is provided with a mounting 99 to serve as a pivotal anchorage for the inner end of an overside discharge belt conveyor 100. Said inner end of the belt conveyor structure carries a hopper 101 to receive material from either of the hoods 97, 98 of the transverse conveyor 96. As shown in FIG. 3, the overside discharge conveyor 100 is mounted on the starboard side of the ship. It is positioned and supported by a boom 102S the inner end of which is carried by universal pivot mounting 103S located on the poop house front, the free end of said boom being supported by a cable running round multiple purchase blocks 104S, 105S, the inner block being suitably anchored on the bridge front. To enable convenient location of the discharge conveyor overside, and lifting of said conveyor on detachment from the anchorage 99 for stowage in the transverse position 100' on the poop deck (as shown in dotted lines in FIG. 5) the boom 102S is provided with a movable underhung trolley 106S. This trolley carries a single pulley in a block 107 over which are passed wire rope slings 122 supporting the frame of the conveyor 100, which carries at its outer end a drive motor 114 and reduction gear 115 for the conveyor belt. The boom 102S also carries adjacent its inner end an air motor 108S having rope drums 109 from which wire ropes 110 extend over pulleys 111 to the trolley 106 for displacing said trolley.

A cable 112 reeved around the multiple purchase blocks 104S, 105S for supporting and displacing the boom 102S is operated by an air hoist 113S mounted on the poop deck. As indicated, a duplicate of the boom 102P with its universal mounting 103P, multiple purchase blocks 104P, 105P, air motor 108P and air hoist 113P, are mounted symmetrically on the port side of the poop for the discharge of cargo to that side of the ship. In FIGS. 4 and 5, the booms are shown in stowed positions 102', 102". As can be seen in FIG. 5, the overside discharge conveyor 100 can by means of either of the supporting booms 102S, 102P be located at any desired position within a rearward angle of about 30° and a forward angle of about 80°, and angular displacement of the conveyor within this range may be effected if required, while the discharging apparatus is in operation.

In the embodiment illustrated in FIGS. 6–8, a single belt conveyor 58 mounted on the ship's main deck, extending fore-and-aft on one side of the hatches 45, discharges into a boot 92 of a bucket elevator 93 located aft of the break of the forecastle. Said elevator extends upwards and towards the centre line of the ship, where it discharges to a rearwardly extending apron belt conveyor 116. There is provided on the centre line of the forecastle deck a pivotal anchorage 118 for the forked inner end of a first overside discharge belt conveyor 100A, provided with a hopper 117 to be fed by the conveyor 116. The lattice frame of this conveyor, which carries at its outer end an electric motor 114 and speed reduction gear 115 for the conveyor belt, is supported as shown, to extend from the centre line of the forecastle over the starboard side thereof, by a boom 102P mounted on a horizontal pivot 119P on a rotatable sampson post 120P standing at the port side of the forecastle. This post is rotatable through 360°, and is self-supporting. The free end of the boom 102P is attached to a multiple purchase block 104P, and the heaving wire 112P of this purchase is guided by a multiple swivel pulley 121P located at the top of the sampson post 120P and through the interior of said post to a winch 113P.

The frame of conveyor 100A is supported from the boom 102P in the manner above described by wire rope slings 122 from an underhung trolley 106P, displaceable along the boom by wire ropes 110 reeved around pulleys 111 from drums 109 driven by an air motor 108.

A second overside discharge belt conveyor 100B is attached by its inner end to the outer or free end of the first conveyor 100A in tandem disposition to provide an extensive outreach for the discharge of bulk material from the ship. This second conveyor is supported and manoeuvrable in the manner above described by a second sampson post 120S located at the starboard side of the forecastle, and has at the inner, upper corners of its frame two engaging pins 123B which are locatable in a pair of slots 124A at the outer, lower corners of the frame of the first conveyor 100A. Thus material is delivered from the outer end of the belt of conveyor 100A to the inner end of the belt of the second conveyor 100B so that said material can be discharged to a receiving location distant from the ship's side.

The two discharge conveyors 100A, 100B are identical so that either can be used alone, or as a first or inboard lateral discharge conveyor while the other is used as a second or outboard tandem discharge conveyor, as convenient, and each comprises adjacent its outer end an electric motor 114, and speed reduction gear 115 for driving its own belt.

When the two conveyors 100A, 100B are disengaged from one another, they can evidently be manoeuvred by the booms 102S, 102P and the sampson posts 120S, 120P for stowage on the ship's deck, and for re-assembly for discharging bulk cargo to either side of the ship's forecastle as required.

FIG. 9, 10 and 11 illustrate another embodiment of discharging apparatus wherein two trough belt conveyors 58P, 58S are disposed in trunks 62S, 62P lengthwise of a ship below the main deck thereof and on each side of hatches 45. Each of these conveyors extends as shown into the space below the ship's forecastle to provide two discharge points forward, and they may be reversible and extend likewise into the space below the poop to provide two more discharge points aft. Alternatively each of the conveyors 58P, 58S may comprise two aligned lengths driven independently so that the forward lengths can serve to feed cargo from the holds forward or midships to the forecastle discharge points and the after lengths can serve to feed cargo from the holds aft of midships to the after discharge points; this arrangement is convenient when a ship is equipped with two unloading bridges, for example as described in our aforesaid co-pending patent application. As shown in FIGS. 9 and 11, in the space below the forecastle, that is, forward of the holds (and if required, similarly in the space below the poop, and aft of the holds) the conveyor belts 58P, 58S discharge material respectively into inclined chutes 125P, 125S which feed the material to two bucket elevators 93P, 93S, located within the sides of the forecastle. These bucket elevators have discharge hoods 94P, 94S which are rearwardly inclined. Below each of the discharge hoods (as shown at the right hand side of FIG. 10) there is provided on the forecastle deck an anchorage as shown at 99S for the inner end of the frame of an overside discharge conveyor 100, which is constructed in the manner hereinbefore described and supported by a trolley 106S running beneath a boom 102S which in turn is universally pivoted to and supported from a starboard side sampson post 120S. A similar anchorage not shown is provided at the port side below the elevator discharge hood 94P and another sampson post 120P is mounted at that side of the forecastle and carries another boom 102P by which alternatively the conveyor 100 can be supported in outward extension from the port side of the forecastle. The discharging apparatus thus permits cargo to be discharged from either side of the forecastle, according to which combination of conveyor and bucket elevator 58P, 93P or 58S, 93S is being supplied with cargo lifted from the holds. Similarly cargo can be discharged at either quarter of the ship when similar elevating apparatus is provided at the break of the poop.

FIG. 9 also illustrates a feature of a ship equipped with a collapsible, mobile cargo handling bridge according to our said co-pending patent application Ser. No. 110,365, namely the provision of a housing within the forecastle for such bridge when lowered for stowage. The rear wall 126 of the forecastle is provided with a plurality of track mounted, vertical hinged doors 127 adapted to be moved aside to provide a wide opening for the passage into the forecastle of the bridge running on rails on the main deck. It will be observed that the provision of this entry into the stowage space for the bridge does not require any abnormal elevation of the forecastle deck 129 above the main deck 128, the bridge being capable of collapsing to a height of about 14–16 feet from the main deck.

FIGS. 12 and 13 show in elevation and plan an alternative arrangement of elevators for handling cargo to be discharged on either side of the ship from a single belt conveyor 58 running lengthwise of the ship beside the hatches 45. At the break of the ship's poop, the conveyor 58 discharges into an inclined chute 125 which feeds the material to the lower end of a first elevator 130 extending upwardly and transversely to the opposite side of the poop deck, where the upper part of the elevator is totally enclosed by a cover 132, which comprises a discharge hood 133. The hood 133 is located above a recess 134 in the side of the poop deck in which is provided, in a manner not shown and as hereinbefore described, a pivotal anchorage for an overside discharge conveyor 100, supported for example by a boom mounted on a sampson post. The elevator 130, which may be of the linked trough plate type, when arranged thus to feed directly into the receiving hopper of a discharge conveyor arranged as shown on the left in FIG. 12, enables material brought from the holds by the conveyor 58 along the port side of the ship to be discharged on the starboard side. To permit discharge on the port side, there is provided a second elevator 131 extending obliquely upwards from below the starboard side of the poop deck to above the port side of said deck, the upper part of this elevator being completely enclosed by a cover 135 which comprises a discharge hood 136 below which is located in a recess in the poop deck an anchorage for the discharge conveyor 100 when disposed as shown in chain-dot lines to extend from said port side. To permit feeding of the discharge conveyor, when thus arranged, by the elevator 131 there is provided a removable, oblique bypass trunk 137 adapted to be secured between the discharge hood 133 of the elevator 130 and an inclined feed chute 138 at the lower end of the elevator 131. Thus for discharging on the port side the material is first elevated and moved transversely by the elevator 130 and then falls through the trunk 137 to the bottom of the elevator 131 by which it is transferred to the inner end of the discharge conveyor anchored at the port side of the ship.

FIG. 14 illustrates a modification of the arrangement last described, for use when a ship is fitted with two lengthwise conveyors and preferably with two cargo handling bridges, affording the choice of four discharge points to port and starboard, forward and aft. With this arrangement, the grab of one bridge can be used to load one conveyor 58S while the grab of the other bridge is use to load the other conveyor 58P. Assuming that the arrangement shown in FIG. 14 is a view looking aft at the break of the poop, and discharge is required at the starboard side, the port side conveyor 58P is capable of transferring the material to a discharge conveyor 100 anchored and supported as above described to extend from the starboard side of the poop, by way of the elevator 130 delivering material direct from its discharge hood 133 into the receiving hopper at the inner end of said discharge conveyor 100. The conveyor 58P is therefore driven in the direction to carry aft the material delivered thereto from the holds. The conveyor 58S located at the starboard side of the ship will then be driven in the direction to carry material forward, and since it may at the bow be necessary to discharge the cargo from the same side of the ship, at this location an arrangement of crossed elevators 130 and 131 will both be used, the removable trunk 137 being inserted between the discharge hood 133 of the elevator 130 and the feed chute 138 for the elevator 131 to transfer the cargo. The arrangement is completely flexible, permitting cargo to be discharged at the same side of the ship simultaneously fore-and-aft, or on opposite sides of the ship, subject to the limitation that the conveyor at the left hand side when looking from amidships towards the crossed elevator system can only feed material to the one elevator which transfers said material to the opposite side of the ship.

FIGS. 15 and 16 are respectively a transverse section and a fore-and-aft section of a hopper device carried by a mobile bridge, as briefly described in our co-pending application, for use on an "open ship" wherein each hold has a transversely disposed pair of hatches 45 and a single belt conveyor 60 is located to run lengthwise of the ship in a trunk 62 below the portion of the main deck 61 between said hatches.

In the deck 61 is a longitudinal opening with lateral guide plates 63 extending for substantially the length of the hatches 45 and adapted to feed material to the conveyor from either of two discharge hoods 59 extending over the ends of a longitudinally disposed apron belt feeder 64 which is mounted in the bottom of a hopper 65. This hopper is carried by a twin cradle structure 66 slung between the transverse beams of the main carriage 4 of a mobile bridge. In order to permit the conveyor 60 to be loaded with material elevated by a grab from either of the hatches 45 (as described in our said copending application) while permitting the grab to be lowered and lifted adjacent the inner wall of the hatch, the hopper 65 is provided with a reversible upper section 67 formed as a stirrup with pentagonal side plates 68 turnable through 180° about horizontal pins 69 between fixed trapezoidal end plates 70, and with a pivoted transverse plate 90 adapted to fall so as to be supported at its inner end on either of the wings of the hopper 65 and at its side upon fillets 91 attached to the side plates 68, as a floor for said upper, laterally extending section of the hopper.

Depending on which side of a cargo hold is being unloaded by means of a grab, said upper section 67 of the hopper is displaced to leave the hatch at that side clear for the lowering and lifting of the grab. Thus, when as shown in FIG. 15 the right hand hatch is open for discharging bulk cargo, said upper section 67 is turned over to the left hand side, permitting the grab to be lowered and lifted adjacent the inner side of the right hand hatch and displaced to left of centre for discharging bulk material into the hopper and thence to the central conveyor 60. Evidently when cargo is being unloaded through the left hand hatch the upper section of the hopper is turned over to right of centre.

An arrangement of discharging apparatus for use with a conveyor 60 extending lengthwise between twin hatches 45 as last described, is illustrated in FIGS. 17–19. The conveyor 60, of which the dicharge end rises adjacent the berak of the poop, feeds material to a boot 92 of a bucket elevator 93 which rises from adjacent the centre line of the main deck to the starboard side above the poop deck. The discharge hood 94 of the elevator is arranged to deliver material over a cross apron feeder 95 to the starboard end of a transverse reversible belt conveyor 96. The conveyor 96 is fitted with starboard and port side discharge hoods 97, 98 located in the manner above described above alternative anchorages 99 at opposite sides of the poop deck for an overside discharge conveyor 100 supported as shown by a boom 102P mounted on a universal pivot 103P attached to the front wall of the bridge and in turn supported by a multiple purchase, the inner block 105P of which is also anchored to the bridge front. A duplicate boom 102S is similarly anchored and supported at the port side of the bridge, as an alternative support for the discharge conveyor 100 when it is required to discharge cargo at the port side of the ship. Evidently, for discharge at the starboard side the transverse conveyor 96 is run anti-clockwise to transfer material delivered by the bucket elevator 93 to the starboard discharge 97, and when discharge is required at the port side, the conveyor 96 is run clockwise to transfer material to the port side discharge hood 98.

What is claimed is:

1. In a ship having a deck, holds below said deck, hatches opening through said deck from said holds, and at least one fixed structure erected upon said deck, an unloading apparatus for bulk cargo from said holds comprising at least one belt conveyor extending lengthwise of said deck substantially at the level of said deck, at least one overside discharge belt conveyor, said overside discharge. conveyor having a rigid frame and being stowable transversely on said deck, at least one anchorage adjacent said fixed structure and upon said deck, on which anchorage an inner end of said rigid frame is adapted to be mounted removably and pivotally about horizontal and vertical axes, two booms universally pivoted each at its inner end upon transversely spaced pivots on said fixed structure, two winches, two multiple purchase cables extending from said winches one to each of said booms to support said booms at a variable angle to the horizontal, means to suspend from one of said booms said rigid frame when pivotally mounted so as to support said discharge belt conveyor in extension over either side of the ship, and elevator conveyor means for transferring cargo from said lengthwise belt conveyor to said discharge belt conveyor.

2. The combination of a ship and an unloading apparatus therein as claimed in claim 1, wherein the ship has on said deck two pivotal anchorages, one adjacent each side of said deck upon either of which the inner end of said rigid frame is removably and pivotally mountable to be supported in extension over the adjacent side of the ship by one of said booms.

3. The combination of a ship and an unloading apparatus therein as claimed in claim 2, wherein said elevator conveyor means is transversely disposed and adapted to receive bulk cargo from said lengthwise belt conveyor and to deliver said cargo to said overside discharge belt conveyor when extended over either side of the ship.

4. The combination of a ship and an unloading apparatus therein according to claim 1, wherein said overside discharge belt conveyor is adapted to be pivotally anchored by its inner end upon said anchorage located at the centre line of the ship, and to be slung for extension over either side of the ship upon one of said two booms.

5. The combination of a ship and an unloading apparatus therein according to claim 1, comprising two like overside discharge belt conveyors, either one of said discharge conveyors being adapted to be pivotally anchored upon said pivotal anchorage, and said two discharge conveyors having means for their interconnection in tandem with the discharge end of said one belt conveyor located to feed material to the receiving end of the other, said pivotally anchored belt conveyor being slung upon one of said two booms suspended athwartships and the other of said discharge conveyors being slung upon the other of said booms suspended over a side of the ship.

6. The combination of a ship and an unloading apparatus therein according to claim 1, wherein each boom has an underslung trolley displaceable along the boom, said suspending means for each of said overside discharge conveyors being slung from one of said trolleys.

7. The combination of a ship and an unloading apparatus therein according to claim 1, wherein said fixed structure is a superstructure of a ship and each of said booms and its multiple purchase are universally anchored upon a lateral portion of a wall of said superstructure.

8. The combination of a ship and an unloading apparatus therein according to claim 1, wherein said fixed structure comprises a pair of transversely spaced sampson posts standing upon the deck of the ship, and each of said booms and its multiple purchase are universally anchored upon one of said sampson posts.

9. The combination of a ship and an unloading apparatus therein according to claim 1, wherein each of said holds of the ship has a single hatch, and said lengthwise belt conveyor is located at one side of the hatch.

10. The combination of a ship and unloading apparatus therein according to claim 1, wherein each of said holds of the ship has two transversely disposed hatches, and said lengthwise belt conveyor is located between said two hatches.

11. The combination of a ship and an unloading apparatus therein according to claim 1, wherein each of said holds has a single hatch, and two lengthwise belt conveyors are located one at each side of the hatch.

12. The combination of a ship and an unloading apparatus therein according to claim 1, further including in combination a pair of rails extending lengthwise of the ship's deck, a wheeled carriage adapted to be displaced on said rails, a bridge which is supported on said carriage and provides a transverse runway, hoisting means mounted on said runway and a grab suspended from said hoisting means, said bridge extending over said hatches and said lengthwise belt conveyor, and a hopper mounted on said carriage for delivering cargo from said grab to said lengthwise belt conveyor.

References Cited in the file of this patent

UNITED STATES PATENTS

| | | |
|---|---|---|
| 974,104 | Doxford | Oct. 25, 1910 |
| 1,565,875 | Von Haase | Dec. 15, 1925 |
| 1,808,862 | Peterson | June 9, 1931 |
| 2,490,609 | Andersen | Dec. 6, 1949 |
| 2,827,181 | Bartenfeld | Mar. 18, 1958 |
| 3,009,586 | Isbrandtsen | Nov. 21, 1961 |